Aug. 23, 1966        A. W. FAUX ET AL        3,267,878
BALANCING MECHANISM FOR DRAFTING TABLES
Filed Aug. 6, 1964                           3 Sheets-Sheet 2
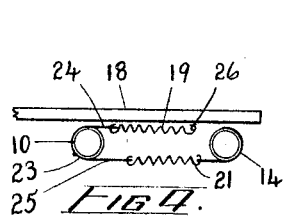 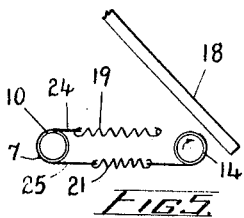 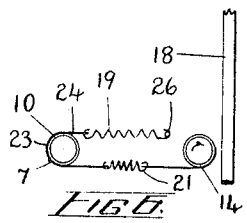
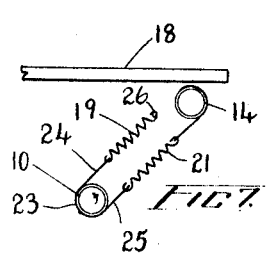 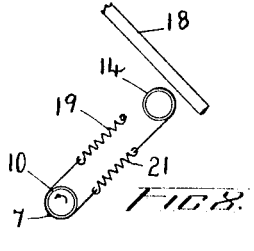 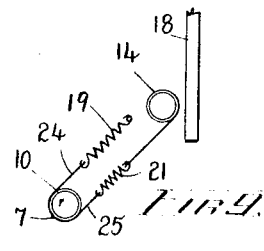
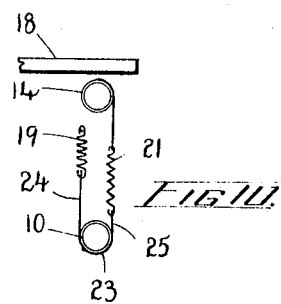 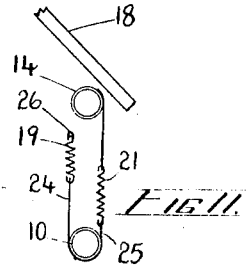 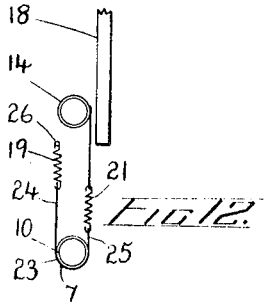
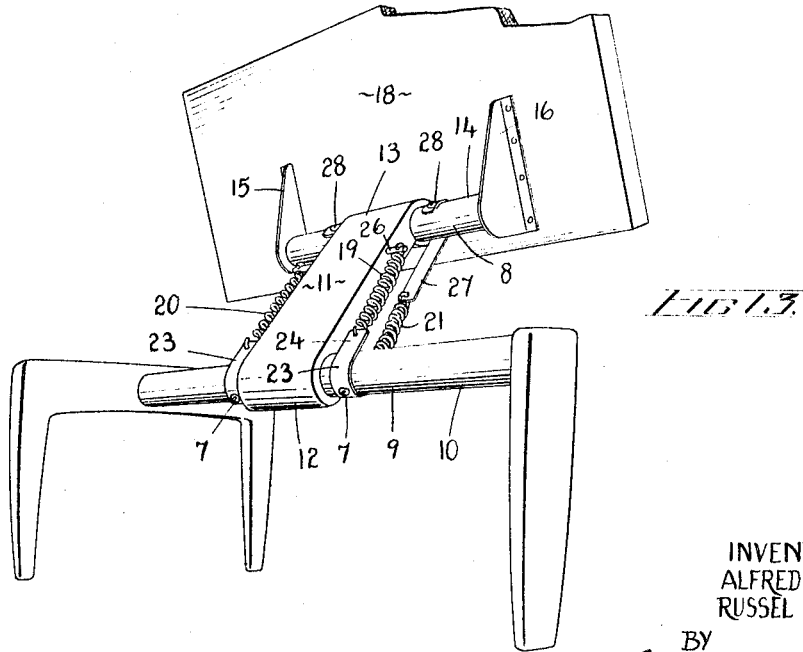
INVENTORS
ALFRED WILLIAM FAUX
RUSSEL EARL HELLAND
BY
ATTORNEY

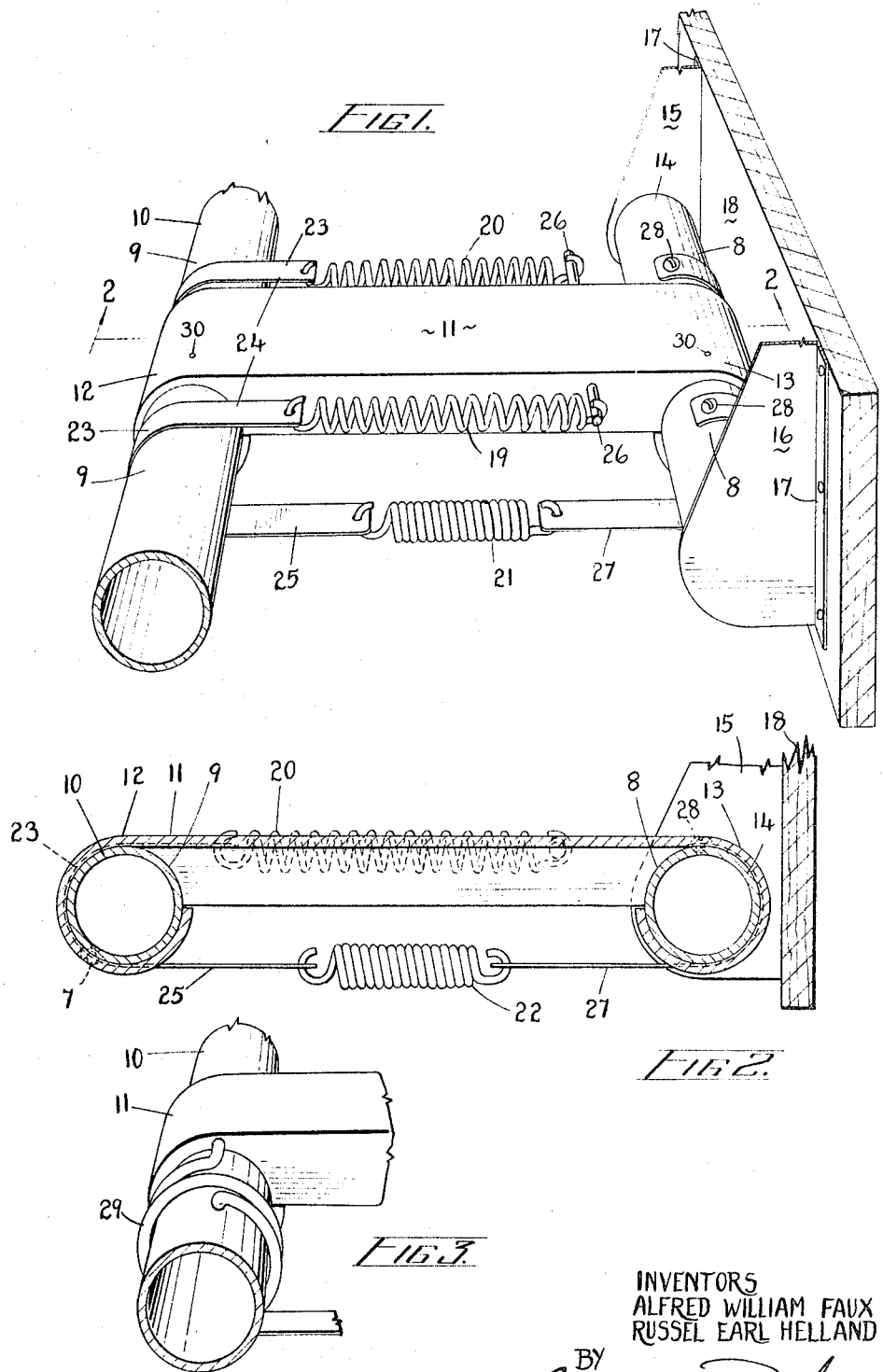

INVENTORS
ALFRED WILLIAM FAUX
RUSSEL EARL HELLAND
BY
ATTORNEY

United States Patent Office 3,267,878
Patented August 23, 1966

3,267,878
BALANCING MECHANISM FOR
DRAFTING TABLES
Alfred William Faux, Don Mills, Ontario, and Russel Earl
Helland, Toronto, Ontario, Canada, assignors to Norman Wade Company Limited, Ontario, Canada, a corporation of Canada
Filed Aug. 6, 1964, Ser. No. 387,852
7 Claims. (Cl. 108—2)

This application is a continuation-in-part of our copending application Serial No. 297,185, filed July 22, 1963, now abandoned.

This invention relates to a balancing mechanism and in particular to a balancing mechanism for drafting or drawing tables and the like.

In the drafting and drawing art, it is customary to provide a drafting table which is mounted on a trestle, table, stand or other fixture having a counterbalanced mechanism so that it can be readily adjusted to various elevations and inclinations. Heretofore the counterbalanced mechanism for providing such adjustments has been of a complicated nature with the consequent expense of constructing the same. Furthermore, the range of adjustments obtainable with such mechanisms were limited and not sufficient to permit the drawing board to be placed at all elevations and inclinations desired by a draftsman in executing his drawing.

It is an object of the present invention to provide a balancing mechanism for an adjustable mount for a drafting table which will permit the table to be adjusted to a wider range of elevations and inclinations than has heretofore been practical.

A further object of the invention is to provide a simple balancing mechanism which is easily operated by the draftsman when he desires to change the elevation or inclination of the drafting table.

A still further object of the invention is to provide a balancing mechanism which will hold and support the drafting table in any of the positions to which it is adjusted so that, when the draftsman wishes to adjust the table to a new position, after releasing a locking mechanism he will only have to overcome the inertia of the mechanism and friction between the moving parts.

The balancing mechanism of the present invention comprises the combination of a fixed non-rotatable stationary member, an arm having one end pivotaly mounted on the member for pivotal swinging movement thereon and a table support member rotatably mounted on the other end of said arm, said table support being parallel to the stationary member, said support member having a radially extending table mounting means at each end thereof providing a rotatable mounting means for a table and counterbalancing means comprising a first force system arranged and operatively connected to the stationary member and to the said arm, said first force system applying to the arm a moment equal to a balancing moment caused by the weight of the arm and related parts supported thereby and a second force system arranged and operatively connected to the stationary member and to said table support member to apply a balancing moment thereto equal to a counterbalancing moment caused by the weight of the table and the mounting means whereby said first force system and said second force system cooperate to balance said arm, said mounting brackets and related parts in a state of static equilibrium.

For an understanding of the invention, reference is made to the following description illustrated by the accompanying drawings in which:

FIGURE 1 is a perspective view of the balancing mechanism applied to a drafting table adjustable mount;

FIGURE 2 is a cross-section of the structure shown in FIGURE 1 taken on the line 2—2 of FIGURE 1;

FIGURE 3 is a fragmentary perspective view illustrating an alternative construction;

FIGURES 4, 5 and 6 are diagrammatic views showing both the mount and the drafting table in a horizontal position; with the mount in a horizontal position and the table tilted at an angle less than 90°; and with the mount horizontal and the table in a vertical position respectively;

Figure 14:
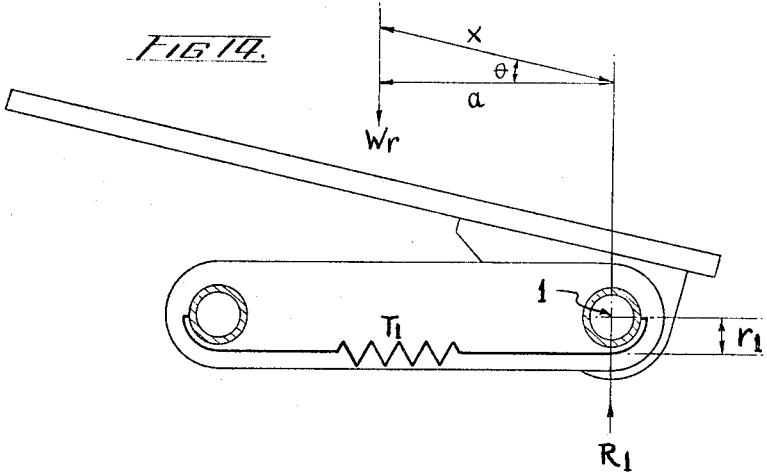
Figure 15:
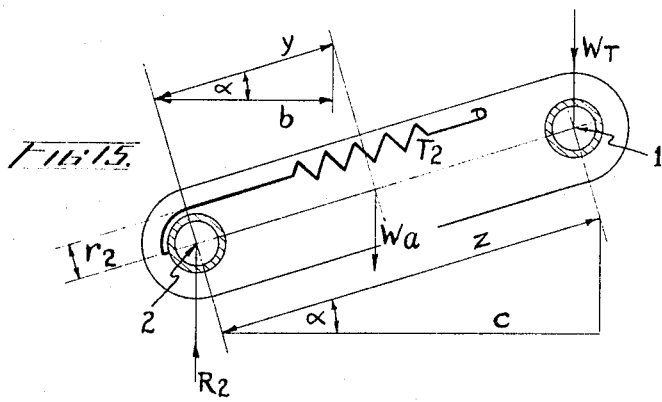
Figure 16:
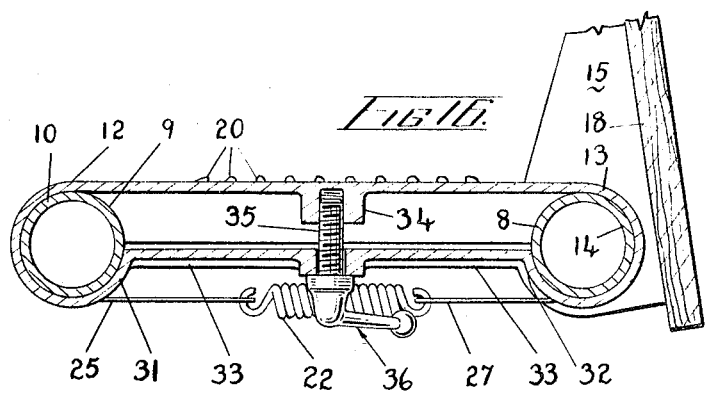

FIGURES 7, 8 and 9 are diagrammatic views showing the drafting table in the same positions as in FIGURES 4, 5 and 6 respectively with the mount rotated on its fixed axis counterclockwise less than 90°;

FIGURES 10, 11 and 12 are diagrammatic views showing the drafting table in the same position as in FIGURES 7, 8 and 9 respectively with the mount rotated on its fixed axis counterclockwise less than 90°;

FIGURE 13 is a perspective view showing the invention and its fixed mount;

FIGURE 14 is a diagrammatic representation of the tilt spring force system about the pivotal axis of the drawing table;

FIGURE 15 is a diagramatic representation of the lift spring force system about the pivotal axis of the arm; and FIGURE 16 is a view similar to FIGURE 2 but showing an alternate locking mechanism.

The balancing mechanism illustrated in the drawings is shown in conjunction with a bracket mounting for supporting a drafting table but it will be understood that the same is shown by way of illustration and not as a limitation since it will be apparent that the invention will have application to uses other than the one illustrated.

The drafting table mount comprises a fixed beam 10 preferably tubular to provide an outwardly facing circular peripheral surface, supported in a horizontal plane on a table or other suitable fixture (not shown), an arm 11 having one end 12 pivotably supported on the beam 10 for pivotal up and down movement and the other end 13 rotatably supporting a table support member 14 which carries on opposite ends thereof a pair of mounting brackets 15, 16 respectively. The brackets 15, 16 are each provided with a mounting flange 17, by means of which a drafting table 18 may be fastened to and mounted on the brackets by means of screws entered through the flanges and into the drafting table. The member 14 also carries an outwardly facing circular peripheral surface 8 having the same diameter as the surface 9, one on each side of the beam.

The means for counter-balancing the structure hereinbefore described, comprises a first force system which in the present embodiment consists of a pair of lifting springs 19, 20 one on each side of the arm 11 and a second force system which is illustrated as consisting of a pair of tilting springs 21, 22 also placed one on each side of the arm 11.

Both of the lifting springs are connected to the arm 11 and the fixed beam 10 in the same manner to apply a lifting force to the arm which balances the gravitational force on the arm, support member 14, brackets 15, 16 and the drafting table 18. Consequently, it is only necessary to describe the manner in which one of the lifting springs is connected and this will be done with reference to lifting spring 19. A steel strap 23 is wrapped around the surface 9 of the fixed beam 10 as shown with its upper and lower ends 24, 25 respectively extending towards the member 14, the ends 24, 25 being substantially parallel to each other and to the upper and lower surfaces of the arm 11 respectively. The strap 23 is secured to the surface 9 by screws 7 which is entered centrally therethrough. The upper end 24 of the strap 23 is substantially tangential to the periphery of the surface 9 and is also substantially parallel to and closely adjacent to the upper surface of the arm 11 while the lower end 25 is also tangential to the periphery of the beam 10 and substantially parallel with the lower surface of the arm 11. A pin 26 projects outwardly from the side of the arm 11, the pin being located adjacent the upper surface of the arm 11 and in proximity to the tubular arm 14. The spring 19 has one end fastened to the end 24 of the strap 23 and the other end hooked around the pin 26.

The tilting spring 21, and likewise the tilting spring 22 has one end connected to the end 25 of the strap 23 and the opposite end fastened to a steel strap 27 which is wound partially around the arm 14 and secured to the arm by a self-threading screw 28. The lift springs 19, 20 work in conjunction with the tilt springs 21, 22.

In the position shown in FIGURES 1 and 2, the arm 11 is shown in a horizontal position and the drafting table is in a substantially upright position. In that position, the tilt springs 19, 20 have maximum tension and balance the weight of the board, brackets 15, 16 table support member 14 and the arm 11 and other parts in front of the fixed beam 10. Consequently the system may be said to be in static equilibrium. With the arm 11 still in a horizontal position and the drafting table moved to a substantially upright position as shown in FIGURES 1 and 2, the spring 21 is at its minimum tension and will apply no moment to the tubular member 14. If the table is then brought from the upright position as shown in FIGURES 1 and 2 to any of the horizontal positions shown in FIGURES 4, 7 and 10, the moment, caused by the weight of the board and related parts, is reduced. At the same time, the strap 27 is wrapped around the surface 8 of member 14 increasing the tension of the springs 21, 22 and the brackets in all positions between the upright and horizontal as shown. This causes a downward pull on the arm 11 equal to the decrease in the moment. Thus the system is in static equilibrium. As the arm 11 is raised (moved counter-clockwise on its fixed axis) as viewed in the drawings (FIGS. 7, 8 and 9), the end 24 of the strap unwraps from the surface 9 of the member 10 decreasing the tension on the lift springs 19, 20 thus compensating for the decreased moment. When the arm 11 is vertical, the lifting spring is relaxed. In this position, the tilt spring balances the arm 11 when their combined center of gravity goes behind the fixed beam 10 which conditions will prevail in the positions shown, for example, in FIGURES 10 and 11.

Referring now to FIGURE 3, it shows a modification in which a torque spring 29 replaces one or both of the lift springs 19, 20. It will be seen in FIGURE 3, that the torque spring is coiled around the fixed beam 10 and has one end secured to the fixed beam and the opposite end secured to the side of the arm close to the upper surface thereof.

In order to preclude movement of the drawing table when in use, from a selected position, a locking mechanism is provided to releasably clamp the end portions 12 and 13 about the beam 10 and the table support member 14 respectively.

As shown on FIGURE 1, locking screws 30 may be used, however, a preferred embodiment of a locking expedient for use herein is one in which end portions 12 and 13 are locked or released simultaneously by manipulation of a single locking handle.

As illustrated in FIGURE 16, terminal portions 31 and 32 of end portions 12 and 13 are interconnected by a substantially rigid, ribbed plate 33. Plate 33 includes an internally threaded boss 34 operable to engage with a threaded locking member 35.

The upper end of the locking member 35 is retained in the upper portion of arm 11 for rotation only, such that upon manipulation of handle 36, plate 33 may be moved upwardly and downwardly with respect to the locking member. Upward movement of plate 33 clamps the end portions 12 and 13 about the beam 10 and the table support member 14 while downward movement of the plate 33 releases the mechanism for repositioning the drawing table.

Having described the novel balancing mechanism as applied to and incorporated in a drawing table assembly, the following force system analysis are set forth to further clarify the function of the said balancing mechanism.

It will be appreciated that while the lift springs and the tilt springs operate in conjunction, they are in fact separate systems and the discussion hereinbelow accordingly considers the two spring systems individually.

Referring to FIGURE 15, this figure shows the first force system with respect to the lift springs 19 and 20, such force system being analyzed about the pivotal axis 2 of the drawing table, the pivotal axis 2, being the longitudinal axis of the fixed beam 10, a state of static equilibrium of the arm 11 about the axis 2 is obtained when the sum of the horizontal forces, the sum of the vertical forces and the sum of the moments about that point equals zero. Thus with reference to FIGURE 15 the force system with respect to the lift springs 19 and 20:

$R_2$=Reaction force at the longitudinal axis of the fixed beam (axis 2) due to the weight of the table, arm and attachments;
$Wa$=Weight of the arm;
$W_T$=Weight of the table and mounting attachments;
$T_2$=Tension in the spring counterbalancing WA and $W_T$;
$\alpha$=A variable angle between the arm and the horizontal;
$Y$=A fixed distance from the center of gravity of the arm to axis 2;
$Z$=A fixed distance from axis 1 to axis 2;
$b$=A variable distance measured along the horizontal from the center of gravity of the arm to axis 2;
$c$=A variable distance measured along the horizontal from axis 1 to axis 2;
$r_2$=The moment arm between the spring and axis 2.

$$\Sigma M_2 = 0 \therefore T_2 = Z\frac{\cos \alpha}{r_2}W_T + Y\frac{\cos \alpha}{r_2}Wa$$

$$\Sigma F_{\text{vert.}} = 0 \therefore R_2 = W_T + Wa$$

and $$\Sigma F_{\text{horiz.}} = 0 \text{ (No horizontal force)}$$

From the differential equation $$\frac{dT_2}{d\alpha} = -Z\frac{\sin \alpha}{r_2}W_T - Y\frac{\sin \alpha}{r_2}Wa = 0$$

the maximum and minimum values of $T_2$ may be obtained at $\alpha=0°$ and $\alpha=180°$. However the angle $\alpha$ through which the arm swings in normal practical use, is limited to 90°.

Similarly the state of static equilibrium of the table and brackets about the axis 1 is obtained by a force system wherein the sum of the weight of the table and mounting attachments and the sum of the moments about the axis 1 equal to zero. This force system is illustrated in FIGURE 14 wherein:

$R_1$=Reaction force at the axis 1 due to the weight of the table and mounting brackets;
$W_T$=Weight of the table and the mounting attachments;
$T_1$=Tension in the spring counterbalancing $W_T$;
$r_1$=Moment arm between the axis 1 and the spring;
$\theta$=A variable angle between the axis of the table and the horizontal;
$X$=A fixed distance from the center of gravity of the table to the axis 1;
$a$=A variable distance measured along the horizontal from the center of gravity of the table to the axis 1;

$$\Sigma M_1 = 0 \therefore T_1 r_1 = X \cos \theta \cdot W_T$$

$$\therefore T_1 = X \frac{\cos \theta}{r_1} W_T$$

$$\Sigma F_{\text{Vert.}} = 0 \qquad W_T = R_1$$

$$\Sigma F_{\text{Horiz.}} = 0 \quad \text{(No horizontal forces).}$$

From the differential equation $$\frac{dT_1}{d\theta} = X\frac{\sin\theta}{r_1}W_T = 0$$

the maximum and minimum values of $T_1$ may be obtained at $\alpha=0°$ and $\alpha=180°$.

From inspection, it will be clear that $T_1$ is a minimum when $\theta=180°$, but of course, rotation of the drawing table for practical purposes is limited to substantially 90°. It will be apparent to those skilled in the art that a preferred maximum angle of elevation would be slightly less than 90° to avoid undesirable effects on drafting machines presently used on drawing tables. In any event, it is seldom that a draftsman requires a table to be set in the vertical plane.

A drafting or drawing table constructed in accordance with the present invention as will be seen in FIGURE 13 that the fixed beam can be supported between pedestals leaving space therebetween and below the board completely clear of obstruction since the draftsman's knees and feet are completely clear of obstruction, chair height drafting is made comfortable. The invention also provides a convenient basis for modular table or desk construction. For example the drawing board can be combined if desired, with a desk of which there are two basic shapes, in line and at right angles. In the in line units, a file case, drawer or the like may be hung from or supported by the fixed beam.

What we claim as new and desire to protect by Letters Patent of the United States is:

1. In a balancing mechanism for an adjustable table mounting means, the combination of a fixed non-rotatable stationary member, an arm having one end pivotally mounted on the member for pivotal swinging movement thereon and a table support member rotatably mounted on the other end of said arm, said table support member being parallel to the stationary member, said support member having a radially extending table mounting means at each end thereof providing a rotatable mounting means for a table and interdependent, interacting and mutually compensating counter-balancing means comprising a lift spring system arranged and operatively connected to the stationary member and to the said arm, the lift spring system having a maximum and minimum value obtained from the differential equation $$\frac{dT_2}{d\alpha} = \frac{-Z\sin\alpha\,W_T}{r_2} - \frac{Y\sin\alpha\,W_a}{r_2} = 0$$

wherein:

$W_a$=Weight of the arm
$W_T$=Weight of the table and mounting attachments
$T_2$=Tension in the spring counterbalancing $W_a$ and $W_T$
$\alpha$=A variable angle between the arm and the horizontal
$Y$=A fixed distance from the axis of the fixed stationary member to the center of gravity of the arm
$Z$=A fixed distance from the axis of the fixed stationary member to the axis of the support member
$r_2$=The moment arm between the spring and the axis of the fixed stationary member, and a tilt spring system arranged and operatively connected to the lift spring system and to said table support member to apply a balancing moment thereto equal to a moment caused by the weight of the table and the mounting means, the tilt spring system having a maximum and minimum value obtained from the differential equation $$\frac{DT_1}{d\theta} = \frac{-X\sin\theta}{r_1} \cdot W_T = 0$$

wherein:

$W_T$=Weight of the table and mounting attachments
$T_1$=Tension in the spring counter balancing $W_T$
$r_1$=Moment arm between the axis of the support member and the spring
$\theta$=A variable angle between the axis of the table and the horizontal
$X$=A fixed distance from the centre of gravity of the table to the axis of the support member, whereby said lift spring system and said tilt spring system cooperate to balance said arm, said mounting brackets and related parts in a state of static equilibrium when the table is in any operative position of use relative to the supporting arm.

2. In a balancing mechanism according to claim 1 in which the stationary member and the support member have circular peripheries of substantially the same diameter.

3. In a balancing mechanism according to claim 1 in which the operative connection for the tilt spring comprises a first flexible member extending tangentially to the first fixed member, said flexible member having one end partially wrapped around and fixed to the circular periphery of the stationary member and the other end connected to the contiguous end of the spring, and a second flexible member extending tangentially to the table support member, said second flexible member having one end wrapped partially around and fixed to the circular periphery of the support member, and the opposite end connected to the other end of the tilt spring.

4. In a balancing mechanism for an adjustable mounting bracket according to claim 1 in which the stationary member and the table support member are tubular in cross-section and have substantially the same cross-sectional area.

5. In a balancing mechanism according to claim 1 in which the operative connection for the tilt spring comprises a first flexible member extending tangentially to the stationary member, said flexible member having one end partially wrapped around and fixed to an outwardly facing arcuate surface on the stationary member and the other end connected to the contiguous end of the spring, and a second flexible member extending tangentially to the table support member, said second flexible member having one end wrapped partially around and fixed to an outwardly facing arcuate surface on the support member, said last mentioned arcuate surface having a diameter corresponding to the diameter of the first arcuate surface, the opposite end of the second flexible member being connected to the other end of the tilt spring.

6. In a balancing mechanism according to claim 1 wherein said combination further includes locking means operable to releasably lock said arm relative to said stationary member and said table support member whereby the arm, the mounting brackets and related parts are locked in the selected position.

7. In a balancing mechanism according to claim 6, wherein said locking means includes a releasable clamping member carried by and engageable with the fixed beam and the table support member.

References Cited by the Examiner

UNITED STATES PATENTS

| | | | |
|---|---|---|---|
| 1,956,546 | 4/1934 | Froelich | 108—2 |
| 2,988,843 | 6/1961 | Knudsen | 108—2 |
| 3,078,613 | 2/1963 | Morcheles | 108—2 |
| 3,089,275 | 5/1963 | Alabor | 108—2 |
| 3,131,654 | 5/1964 | May et al. | 108—2 |
| 3,161,159 | 12/1964 | Kirtske | 108—2 |

FOREIGN PATENTS

| | | |
|---|---|---|
| 1,271,094 | 7/1961 | France. |
| 463,870 | 12/1961 | Italy. |

FRANK B. SHERRY, *Primary Examiner.*

G. O. FINCH, *Assistant Examiner.*